United States Patent
Singh et al.

(10) Patent No.: US 10,813,032 B2
(45) Date of Patent: Oct. 20, 2020

(54) SYSTEMS AND METHODS FOR NEIGHBORING NODE DISCOVERY IN A NETWORK

(71) Applicant: LANDIS+GYR INNOVATIONS, INC., Alpharetta, GA (US)

(72) Inventors: Shobhit Kumar Singh, Ghaziabad U.P. (IN); Ankush Sabharwal, New Delhi (IN); Saurabh Jain, Ghaziabad (IN)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 51 days.

(21) Appl. No.: 16/190,561

(22) Filed: Nov. 14, 2018

(65) Prior Publication Data
US 2020/0154339 A1 May 14, 2020

(51) Int. Cl.
*H04W 40/24* (2009.01)
*H04W 28/02* (2009.01)

(52) U.S. Cl.
CPC ..... *H04W 40/246* (2013.01); *H04W 28/0278* (2013.01); *H04W 40/248* (2013.01)

(58) Field of Classification Search
CPC .... H04W 4/70; H04W 84/18; H04L 61/6059; Y02D 70/142; Y02D 70/144
See application file for complete search history.

(56) References Cited

U.S. PATENT DOCUMENTS

2016/0174148 A1* 6/2016 Seed ................. H04W 52/0216
370/311
2016/0380776 A1* 12/2016 Thubert ................. H04L 9/3263
713/175
2017/0149614 A1* 5/2017 Zheng ..................... H04L 41/12
(Continued)

FOREIGN PATENT DOCUMENTS

EP 3110086 12/2016
WO 2015006636 1/2015

OTHER PUBLICATIONS

Narten et al., Neighbor Discovery for IP version 6 (IPv6), RFC 4861, pp. 1-97 (Year: 2007).*

(Continued)

*Primary Examiner* — Jung H Park
(74) *Attorney, Agent, or Firm* — Kilpatrick Townsend & Stockton LLP

(57) ABSTRACT

This disclosure involves neighboring node discovery in a network. For instance, a neighboring node discovery method includes receiving, at a first node, a neighbor solicitation message. The neighbor solicitation message includes an indication that a second node is a low power device and a first scheduled response time. The method also includes transmitting at the scheduled response time, by the first node, a first neighbor advertisement message. The first neighbor advertisement message includes an indication of no availability in a neighbor cache of the first node and a second scheduled respond time. Further, the method includes removing one or more nodes from the neighbor cache, and receiving, at the first node at the second scheduled response time, a second neighbor solicitation message from the second node indicating availability in the neighbor cache. Additionally, the method includes linking the first node and the second node.

18 Claims, 8 Drawing Sheets

(56) References Cited

U.S. PATENT DOCUMENTS

2017/0339099 A1* 11/2017 Levy-Abegnoli ..... G06F 16/951
2018/0124551 A1* 5/2018 Savolainen ....... H04W 36/0033
2018/0176967 A1* 6/2018 Somasandharam ..... H04W 4/70
2018/0212792 A1* 7/2018 Brandt ................ H04L 65/1033

OTHER PUBLICATIONS

Jadhav et al., "Neighbor Management Policy for 6 LoWPAN; draft-ietf-lwig-nbr-mgmt-policy-02.txt", Internet-Draft: Lwig, Internet Engineering Task Force, Ietf; Standardworkingdraft, Internet Society (ISOC), Aug. 24, 2018, 18 pages.

Kitamura et al., "IPv6 Neighbor Cache Update; draft-kitamura-ipv6-neighbor-cache-update- 00.txt", Internet Engineering Task Force,Ietf; Standardworkingdraft, Internet Society (ISGC), Oct. 19, 2009, 9 pages.

International Patent Application No. PCT/US2019/061061, Invitation to Pay Additional Fees, dated Feb. 5, 2020, 15 pages.

International Patent Application No. PCT/US2019/061061, International Search Report and Written Opinion, dated Mar. 26, 2020, 21 pages.

\* cited by examiner

SYSTEMS AND METHODS FOR NEIGHBORING NODE DISCOVERY IN A NETWORK

TECHNICAL FIELD

This disclosure relates generally to processes for neighboring node discovery in a network. More particularly this disclosure relates to the use of neighbor solicitation and neighbor advertisement to discover neighboring nodes that may become potential parent and child node links while limiting bandwidth consumption used for such a discovery process.

BACKGROUND

Networked systems, such as Internet of Things (IoT) devices, such as smart power, gas, and water meters and other smart electronics, are capable of interconnecting with each other for interdevice communication and capable of interconnecting with the internet or other networks. For example, an IoT system provides the ability of IoT devices to communicatively couple with one another and exchange data. The IoT system may include a set of parent nodes that connect to a network (e.g., the internet or an intranet) either directly or indirectly through additional layers of parent nodes. The IoT system may also include a set of child nodes that link with the parent nodes or other child nodes to exchange data up and down a node chain that forms the IoT system.

Certain issues arise with neighboring node discovery in IoT systems. For example, a large number of messages are exchanged during neighbor discovery across the IoT system, which may overwhelm a communication bandwidth of the IoT system. Additionally, keeping up with the neighbor discovery messages may result in low power devices frequently waking up, which may prematurely drain a power source of the low power device. Further, a lossy nature of communication across the IoT system may result in excessive retransmissions of messages, which furthers the overconsumption of the communication bandwidth of the IoT system. Thus, the overconsumption of communication bandwidth in neighbor discovery may reduce or choke available bandwidth for data transmission, increase latency in the network, and limit a lifespan of power sources for low power devices.

SUMMARY

Aspects and examples are disclosed for apparatuses and process for neighboring node discovery. For instance, a neighboring node discovery method includes receiving, at a first node, a first neighbor solicitation message. The first neighbor solicitation message includes a first indication that a second node is a low power device and a first scheduled response time. The method also includes transmitting at the first scheduled response time, by the first node, a first neighbor advertisement message. The neighbor advertisement message includes a second indication of no availability in a neighbor cache of the first node and a second scheduled response time. Further, the method includes removing one or more nodes from the neighbor cache. Additionally, the method includes receiving, by the first node at the second scheduled response time, a second neighbor solicitation message from the second node, and linking the first node with the second node.

In another example, a node of a network includes a processor that executes computer-readable instructions. The node also includes a memory that stores the computer-readable instructions that, when executed by the processor, cause the processor to perform operations. The operations performed by the processor include receiving a first neighbor solicitation message that includes a first scheduled response time from an additional node. Additionally, the operations include transmitting at the first scheduled response time a first neighbor advertisement message to the additional node, and establishing a link with the additional node.

In an additional example, a node includes a processor that executes computer-readable instructions, and a memory that stores the computer-readable instructions that, when executed by the processor, cause the processor to perform operations. The operations performed by the processor include establishing a link with a potential parent node. Additionally, the operations include receiving an unsolicited neighbor advertisement message from the potential parent node indicating a status change of the potential parent node. Further, the operations include updating a neighbor cache stored in the memory to address the status change of the potential parent node.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are provided for neighboring node discovery in a network. For example, within an Internet of Things (IoT) system, a node is any point in the IoT system capable of transmitting data to and receiving data from other nodes or a centralized network (e.g., the internet or an intranet). To provide proper routing between the nodes and the centralized network, the IoT system provides an internet protocol (IP) based infrastructure that transmits data between the nodes by relying on unique identifiers associated with each node (e.g., a unique IP address).

For new nodes to couple to the IoT system, each of the new nodes may identify neighboring nodes that have available capacity to receive data from and provide data to the new node. Identifying the neighboring nodes, which may be potential parent nodes, may be referred to herein as a neighbor discovery operation. Techniques described in the present disclosure may reduce communication bandwidth consumption resulting from the neighbor discovery operations and provide mechanisms that efficiently generate reliable communication links between nodes within the IoT system. Accordingly, certain implementations described herein provide specific processes that provide the IoT system with reduced consumption of data bandwidth in neighbor discovery operations.

Figure 1:
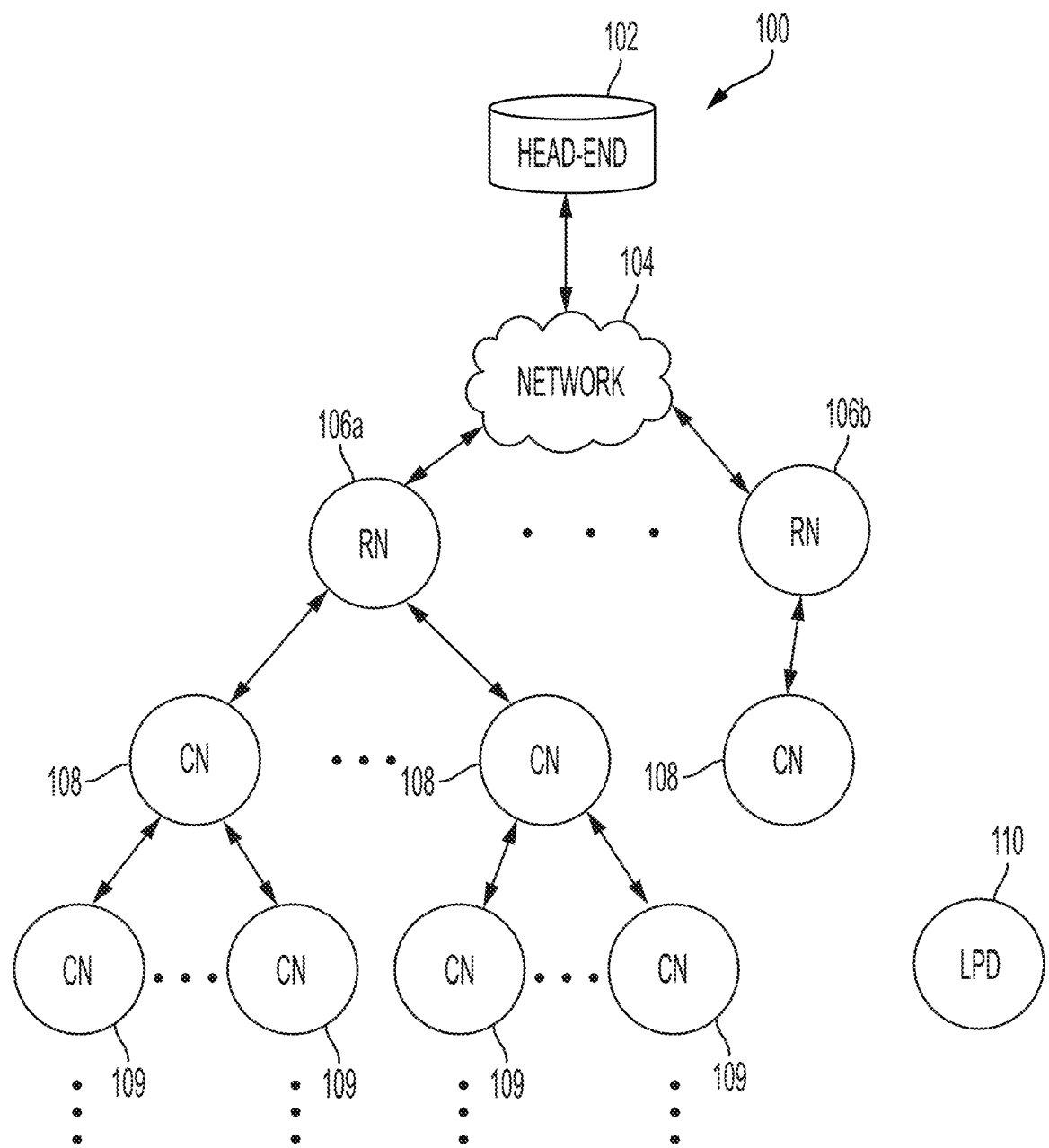
FIG. 1 is a block diagram illustrating an example of an Internet of Things (IoT) system, in accordance with one or more examples.

FIG. 1 is a block diagram illustrating an example of an Internet of Things (IoT) system 100. The IoT system 100 provides a network infrastructure for smart devices (e.g., resource consumption meters, vehicles, home appliances, etc. that include communication technology) to communicate across a network of nodes (i.e., the smart devices), the internet, and/or an intranet. In an example where the IoT system 100 creates a mesh network of smart utility meters, the IoT system 100 includes a head-end 102, which may function as a central processing system that receives a stream of data from a network 104. The network 104 may be the internet, an intranet, or any other data communication network. Root nodes 106 and child nodes 108 and 109 collect data associated with the nodes 106, 108, and 109, and the root nodes 106 transmit the collected data to the network 104 and ultimately to the head-end 102. The root nodes 106 may be personal area network (PAN) coordinators, internet gateways, or any other devices capable of connecting to the network 104.

The root nodes 106a and 106b may generally be referred to as parent nodes due to data links with the child nodes 108 that are located at a node layer (e.g., layer one) below the root nodes 106a and 106b. For example, the root nodes 106a and 106b are illustrated as communicating directly with the network 104. Because of the direct communication between the root nodes 106a and 106b and the network 104, data provided from the child nodes 108 travels through fewer nodes to reach the network 104 and the head-end 102.

The child nodes 108 linked with the child nodes 109 may also be referred to as parent nodes because the child nodes 108 are located at layer one of a network in the IoT system 100, while the child nodes 109 are located at layer two of the IoT system 100. For example, data from the child nodes 109 may travel through the child nodes 108 and the root nodes 106 before the data reaches the network 104 and the head-end 102, while data from the child nodes 108 travels only through the root nodes 106 before reaching the network 104 and the head-end 102. While only a root layer (i.e., the root nodes 106), layer one (i.e., the child nodes 108), and layer two (i.e., the child nodes 109) are illustrated in FIG. 1, more or fewer layers may also be included in the IoT system 100. Further, while FIG. 1 depicts a specific network topology (e.g., a DODAG tree), other network topologies are also possible (e.g., a ring topology, a mesh topology, a star topology, etc.).

As mentioned above, other nodes that are further removed from the network 104 than the root nodes 106a and 106b may also be suitable parent nodes. For example, a node with mains power as a power source for the node may make a more reliable parent node than a battery powered node (e.g., a low power device). Accordingly, when a child node 108 or 109 is tasked with selecting a parent node between a battery powered node in direct communication with the network 104, and a mains power node that is a node layer or more removed from direct communication with the network 104 or with a root node 106, the child node 108 or 109 may select the mains power node as the parent node. This selection may be based on the mains power node providing a constant communication path for the child node, while a battery powered node may regularly enter a sleep mode to conserve battery power.

In an example, a low power device 110, or any other node 108 or 109, that is not presently linked with a neighboring node may perform a neighbor discovery operation to identify a neighboring or potential parent node suitable for a communication strategy of the low power device 110 or other node 108 or 109. While the neighbor discover operation is described below with respect to the low power device 110, any node 108 or 109 may perform the neighbor discovery operation in a similar manner. In the neighbor discovery operation, the low power device 110 transmits a neighbor solicitation message to any of the nodes 106a, 106b, 108, and 109 that are within communication range of the low power device 110. In an example, the low power device 110 transmits the neighbor solicitation message using a radio frequency (RF) transmitter, an RF transceiver, or any other communications device.

The nodes 106a, 106b, 108, and 109 that receive the neighbor solicitation message may transmit neighbor advertisement messages back to the low power device 110 indicating an availability status to link with a new neighbor node and other characteristics of the node 106a, 106b, 108 or 109 that may aid the low power device 110 in deciding which node is the best candidate available to establish a link. For example, the nodes 106a, 106b, 108, and 109 may transmit indications of whether the nodes 106a, 106b, 108, and 109 are mains powered or battery powered. Additionally, the nodes 106a, 106b, 108, and 109 may transmit other indications including node capabilities, target address information, node status information, and time scheduling information.

Based on the information received from the nodes 106a, 106b, 108, and 109 in the neighbor advertisement messages, the low power device 110 may select between the nodes 106a, 106b, 108, and 109 for a bidirectional node data link. As an example, the root node 106b may provide an indication in the neighbor advertisement message that the root node 106b is one node layer removed from the network 104, and the neighbor advertisement message may indicate that the root node 106b has a single child node 108 already linked with the root node 106b. When comparing the neighbor advertisement message from the root node 106b with the neighbor advertisement messages from the root node 106a and the child nodes 108 and 109, the proximity of the root node 106b to the network 104 and the indication that the root node 106b is linked with fewer child nodes 108 than the root node 106a may both influence creation of a bidirectional data link between the root node 106b and the low power device 110. Other considerations may also influence the selection of a parent node by the low power device 110.

Figure 2:
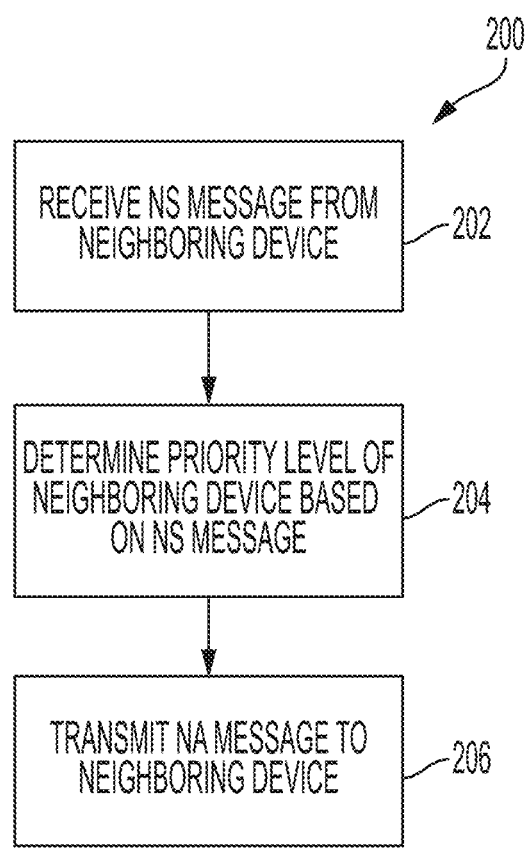
FIG. 2 is an example of a process for neighboring node discovery in the IoT system, in accordance with one or more examples.

FIG. 2 is an example of a process 200 for neighboring node discovery in the IoT system 100. At block 202, the process 200 involves a node 106, 108, or 109 receiving a neighbor solicitation message from a neighboring device. The neighbor solicitation message may include a request for a scheduled response time. In one or more examples, the neighboring device may be the low powered device 110 depicted in FIG. 1, such as a utility meter with a battery power source. In such an example, the low powered device 110 may frequently enter and exit a sleep mode to conserve energy. Accordingly, the scheduled response time may provide an indication to the node 106, 108, or 109 of when the low powered device 110 will be available to receive a response to the neighbor solicitation message of the low powered device 110.

At block 204, the process 200 involves determining a priority level of the neighboring device based on the neighbor solicitation message. By way of example, the neighbor solicitation message received by the node 106, 108, or 109 may provide an indication of device capability of the neighboring device. The device capability may include power capacity, resource capability, prioritization requirements, device throughput capabilities, etc. In such an example, the node 106, 108, or 109 may use the device capability information to determine how the node 106, 108, or 109 will respond to the neighbor solicitation message. Further, in an example where several node solicitation messages are received by the nodes 106, 108, or 109, the nodes 106, 108, or 109 may prioritize the neighboring devices transmitting the node solicitation messages. For example, the nodes 106, 108, or 109 may elevate the priority of the low power device 110 to a priority level above a mains power node that transmitted a node solicitation message to the nodes 106, 108, or 109 within the same time window as the low power device 110. Accordingly, the nodes 106, 108, or 109 may send different node advertisement messages to the low power device 110 and the mains power node based on the different priority levels or may respond to the low power device before responding to the mains power node.

At block 206, the process 200 involves transmitting a neighbor advertisement message to the neighboring device. The node 106, 108, or 109 may transmit the neighbor advertisement message to the neighboring device during the scheduled time indicated in the neighbor solicitation message. In an example, the neighbor advertisement message may include a node status that indicates various states, conditions, or errors about the node 106, 108, or 109. The neighboring device may use the node status information to determine whether the neighboring device will establish a link with the node 106, 108, or 109 or look for an alternative node with which to couple.

The neighbor advertisement message may also include a target address of the node 106, 108, or 109. The target address informs neighboring devices about multiple IPv6 addresses that the node 106, 108, or 109 may have per link layer address. Further, the neighbor advertisement message may include device capability, such as power capability, resource capability, prioritization, etc. In an example where the node 106, 108, or 109 is a low power device (e.g., a battery powered meter), the neighbor advertisement message may also include a scheduled time for the neighboring device to receive the next scheduled neighbor advertisement message or any other scheduled data message. Other information on the neighbor advertisement message is also contemplated within the scope of the present disclosure.

When communicating between nodes 106, 108, 109, and 110 to identify neighbor devices that may be suitable for a bidirectional data link, various information may be provided in neighbor advertisement messages and neighbor solicitation messages to help establish the data links. Further, the neighbor advertisement messages may be solicited (e.g., in response to a neighbor solicitation message from another node), or the neighbor advertisement messages may be unsolicited (e.g., not in response to a neighbor solicitation or neighbor advertisement message). As an example, FIGS. 3-6 include data format options available for communication between the nodes 106, 108, 109, and 110. The information provided in the data format options of FIGS. 3-6 may help a node 106, 108, 109, or 110 identify a parent node suitable for reliable, bidirectional communication.

Figure 3:
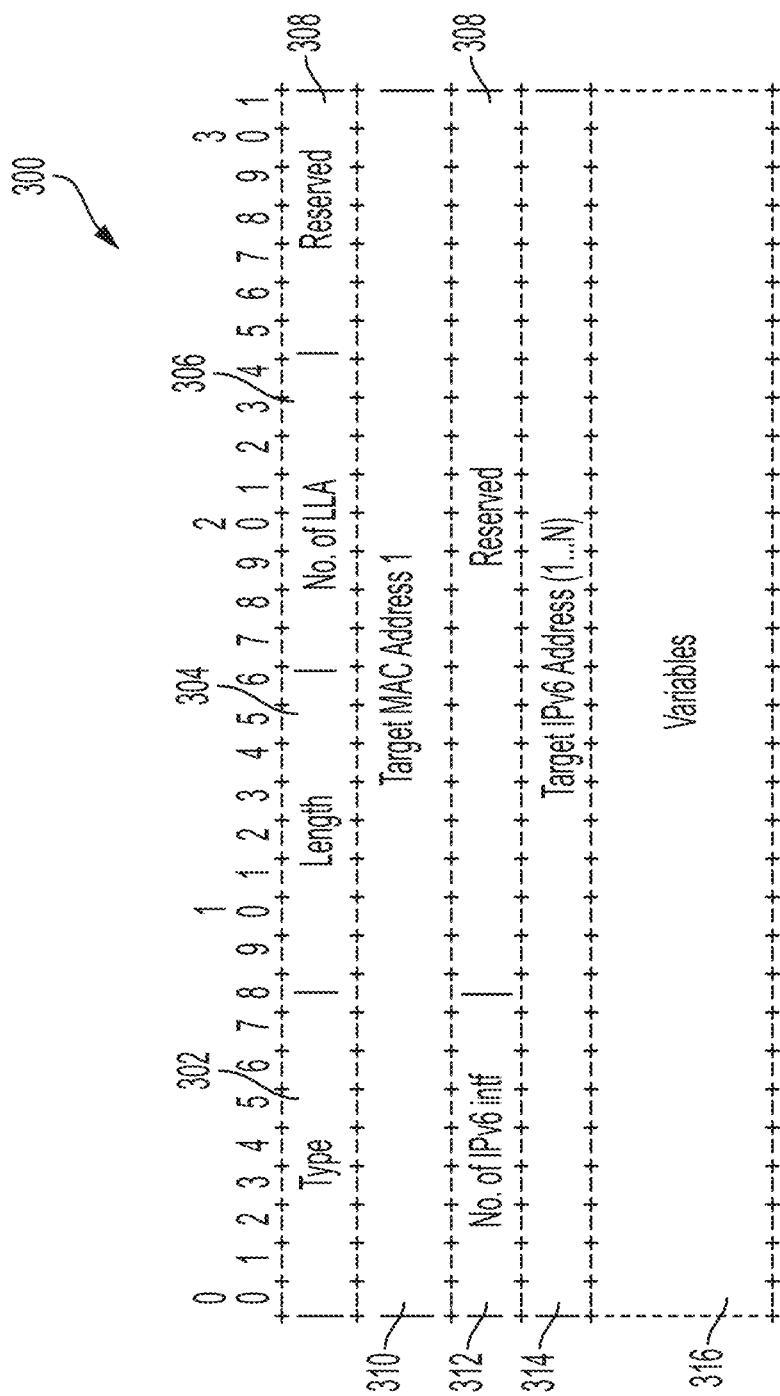
FIG. 3 is an example of a target address option format of a neighbor advertisement message, in accordance with one or more examples.

FIG. 3 is an example of a format for a target address option 300 in a neighbor advertisement message. The target address option 300 provides the neighbor advertisement message with information regarding multiple IPv6 addresses that are included per link layer address of the node. The target address option 300 may include a type indication 302 that provides an 8-bit identifier of an option type to follow. In the target address option 300, the type indication 302 indicates that the option type is a target address option.

After establishing the option type, the target address option 300 includes a length identifier 304. The length identifier 304 may include an 8-bit unsigned integer that includes information about a data length of the target address option 300 inclusive of the type indication 302 and the length identifier 304. A value of the length identifier 304 may be provided in units of octets, and a value of 0 is invalid. For example, an indication of at least two octets to indicate the presence of the type indication 302 and the length identifier 304 may be provided by the length identifier 304.

A number of link layer addresses indication 306 may also form a part of the target address option 300. The number of link layer addresses indication 306 may include an 8-bit unsigned number that contains information about a number of link layer addresses that may be available within the node 106, 108, or 109 transmitting the neighbor advertisement message. A typical node 106, 108, or 109 may generally provide an indication that the number of link layer addresses available is one. However, other numbers of available link layer addresses are also contemplated.

One or more reserved fields 308 may be included at the end of some lines of data. The one or more reserved fields 308 are variable in length, and provide padding to a line of data such that a final structure of the target address option 300 is 32 bits aligned. That is, the target address option 300 includes 32 bits of data on each line of data for the entire target address option 300.

A first target media access control (MAC) address 310 may be included as part of the target address option 300. The first target MAC address 310 is an 8-byte value of the first target MAC address of the node 106, 108, or 109 transmitting the neighbor advertisement message. Because the size of the first target MAC address 310 is 64 bits (i.e., 8 bytes), the first target MAC address 310 may be provided in the target address option 300 over two 32-bit lines of data.

An indication 312 of a number of IPv6 interfaces may be included in the target address option 300 to indicate how many IPv6 interfaces are present within the first target MAC address 310. The indication 312 is an 8-bit unsigned number. The 8-bit unsigned number contains the number of IPv6 interfaces available for the first target MAC address 310. Each of the IPv6 interfaces available in the first target MAC address 310 may be identified by target IPv6 addresses 314. The target IPv6 addresses 314 may each include 16-bytes. Accordingly, a data size of the target IPv6 addresses 314 may be scaled based on the indication 312 of the number of target IPv6 interfaces available for the first target MAC address 310.

After the target IPv6 addresses 314 are provided in the target address option 300, a variables field 316 may provide additional information about additional target MAC addresses. For example, when the number of link layer addresses 306 indicates that the node 106, 108, or 109 includes more than one link layer address, the variables field 316 may output information related to additional target MAC addresses. Further, the variables field 316 may also indicate the target IPv6 addresses associated with the additional target MAC addresses in a format similar to the first target MAC address 310. For example, the variables field 316 may include fields indicating a number of IPv6 interfaces and the target IPv6 addresses associated with the IPv6 interfaces.

The number of link layer addresses indication 306, the target MAC addresses 310, the indication 312 of a number of IPv6 interfaces, and the target IPv6 addresses 314 included in a solicited or unsolicited neighbor advertisement message enable efficient transmission of information from one node to another node. Further, the target address option 300 included in a single neighbor advertisement message decreases communication bandwidth clutter when updating neighbor cache entries. Moreover, the target address option 300 in a neighbor advertisement message increases a likelihood that a receiving node receives all of the information associated with the target address option 300 by including all of the information in an individual advertisement message.

Figure 4:
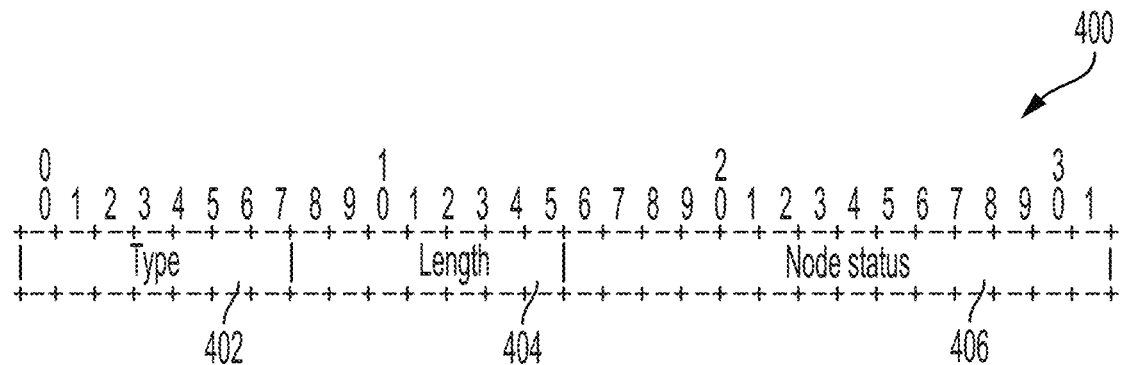
FIG. 4 is an example of a node status option format of a neighbor advertisement message or a neighbor solicitation message, in accordance with one or more examples.

FIG. 4 is an example of a format for a node status option 400 of a neighbor advertisement message or a neighbor solicitation message. When identifying potential data links across the nodes 106, 108, 109, and 110, it may be beneficial for the nodes 106, 108, 109, and 110 to provide status indications of the node. Accordingly, a neighbor advertisement message and/or a neighbor solicitation message may include the node status option 400.

The node status option 400 may include a type indication 402 that provides an 8-bit identifier of an option type to follow. In the node status option 400, the type indication 402 indicates that the option type is a node status option. The node status option 400 also includes a length identifier 404. The length identifier 404 may include an 8-bit unsigned integer that includes information about a data length of the node status option 400 inclusive of the type indication 402 and the length identifier 404. A value of the length identifier 404 may be provided in units of octets, and a value of 0 is invalid. For example, an indication of at least two octets to indicate the presence of the type indication 402 (a first octet) and the length identifier 404 (a second octet), in addition to any octets associated with a node status indicator 406, may be indicated in the length identifier 404.

The node status indicator 406 may include a 16-bit unsigned number that indicates a status of the node 106, 108, 109, and/or 110. In an example, the node status indicator 406 may provide a data code representative of the node status. In such an example, a value of 0 may indicate a success status, a value of 1 may indicate no IP layer connectivity, a value of 2 may indicate that a neighbor cache is full, a value of 3 may indicate that a neighbor cache entry was deleted, and a value of 4 may indicate a tentative cache entry. Other statuses and codes associated with the statuses of the nodes 106, 108, 109, and 110 are also contemplated within the scope of the present disclosure.

In one or more examples, the node status indicators may help the low power device 110 determine whether the low power device 110 should seek a different potential parent node after receiving a neighbor advertisement message that includes the node status option 400. For example, if the node status indicator 406 indicates that the neighbor cache of a potential parent node is full, the low power device 110 may seek a different parent node to avoid a unidirectional flow of information (e.g., data flow from the low power device 110 to the root node 106 but not from the root node 106 to the low power device 110). Additionally, a node status indicator 406 indicating a neighbor cache entry deletion or a tentative cache entry may prompt the low power device 110 or other node 108 or 109 to pursue other potential parent node options. Additionally, the node status indicator 406 may provide an indication of a number of neighbor links at a node 106, 108, or 109. Further, the node status indicator 406 may provide an indication of a maximum number of neighbor links available for a node 106, 108, or 109.

As an example, the node status indicator 406 indicating the tentative cache entry may provide an indication to the low power device 110 or other child node 108 or 109 that the low power device 110 or other child node 108 or 109 can establish a tentative link with the root node 106 or any other node 108 or 109. The tentative cache entry may be in a tentative cache location reserved within a neighbor cache of the root node 106 or any other node, such as node 108 or 109, depending on which node caches the entry. The tentative cache location may provide the root node 106 with the ability to tentatively link with the child node 108 or 109 or the low power device 110 while the child node 108 or 109 or the low power device 110 finds a parent node with more available space in a non-tentative portion of a neighbor cache. Accordingly, the tentative cache location may operate as a cache location reserved for low power devices 110. For example, the root node 106 may keep tentative cache locations available to tentatively link with low power devices 110 when requested. The tentative link between the low power device 110 or other child node 108 or 109 and the root node 106 in such an example is not permanent, and the root node 106 may eventually remove the tentative link between the low power device 110 or other child node 108 or 109 and the root node 106. By indicating the nature of the tentative link with the node status indicator 406, the low power device 110 or other child node 108 or 109 is able to identify a different potential parent node in a pursuit of a more permanent link.

Further, when a link is already established between the low power device 110 and the root node 106 or other node 108 or 109, the low power device 110 may address the node status indicator of no IP layer connectivity by establishing a new link with a different neighboring or potential parent node. In establishing the new link, the low power device 110 may remove information about the original root node 106 from a neighbor cache of the low power device 110 and update the neighbor cache of the low power device 110 with information about the new neighboring or potential parent node.

The process for finding a new parent node for the low power device 110 may track the process 200 described above with respect to FIG. 2. For example, the low power device 110, upon learning that communication with the root node 106 is compromised for any reason, may transmit a node solicitation message to a group of other potential parent nodes. The other potential parent nodes may provide solicited neighbor advertisement messages detailing the capabilities and statuses of the potential parent nodes. The low power device 110 may link with one of the potential parent nodes that the low power device 110 determines provides the best communication capabilities for the low power device 110 (e.g., a mains power node, a number of layers from the root node 106, neighbor cache availability, etc.).

Figure 5:
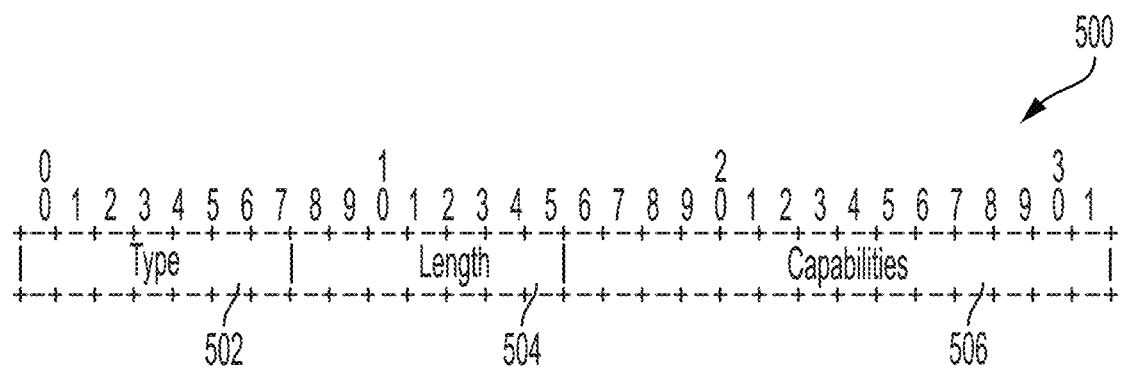
FIG. 5 is an example of a device capabilities option format of a neighbor advertisement message or a neighbor solicitation message, in accordance with one or more examples.

FIG. 5 is an example of a format for a device capabilities option 500 of a neighbor advertisement message or a neighbor solicitation message. When identifying potential data links across the nodes 106, 108, 109, and 110, it may be beneficial for the nodes 106, 108, 109, and 110 to provide device capabilities of the nodes 106, 108, 109, and 110. Accordingly, a neighbor advertisement message and/or a neighbor solicitation message may include the device capabilities option 500.

The device capabilities option 500 may include a type indication 502 that provides an 8-bit identifier of an option type to follow. In the device capabilities option 500, the type indication 502 indicates that the option type is a device capabilities option. The device capabilities option 500 also includes a length identifier 504. The length identifier 504 may include an 8-bit unsigned integer that includes information about a data length of the device capabilities option 500 inclusive of the type indication 502 and the length identifier 504. A value of the length identifier 504 may be provided in units of octets, and a value of 0 is invalid. For example, an indication of at least two octets to indicate the presence of the type indication 502 (a first octet) and the length identifier 504 (a second octet), in addition to any octets associated with a device capabilities indicator 506, may be indicated in the length identifier 504.

The device capabilities indicator 506 may include a 16-bit unsigned number that indicates device capabilities of the node 106, 108, 109, and/or 110 transmitting a message including the device capabilities. In an example, the device capabilities indicator 506 may store a data code representative of the device capabilities. In such an example, a value of 0 may indicate a mains power device, a value of 1 may indicate a battery powered device, a value of 2 may indicate a router device, a value of 3 may indicate that the device requires traffic prioritization, a value of 4 may indicate that the device requires joining prioritization, a value of 5 may indicate a low throughput device, and a value of 6 may indicate a low traffic device. Any other device capabilities of the nodes 106, 108, 109, and 110 that may be desirable to present to another of the nodes 106, 108, 109, and 110 are also contemplated within the scope of the present disclosure.

In one or more examples, the device capabilities indicators 506 may help the low power device 110, the root nodes 106, and/or the child nodes 108 and 109 determine how to interact with a node transmitting a neighbor advertisement message that includes the device capabilities option 500. For example, if the device capabilities indicator 506, typically in a node solicitation message, indicates that a device is a low power device 110 and is seeking a parent node, a root node 106 receiving the device capabilities indicator 506 may rearrange links with other nodes to prioritize establishing a link with the low power device 110. Similarly, device capabilities indicators 506 from a potential parent node may enable the low power device 110 or other child node 108 or 109 to determine whether the potential parent node offers adequate device capabilities to establish a bidirectional data link. Further, the device capabilities indicator 506 provides information regarding the capabilities of the nodes issuing neighbor advertisement and solicitation messages while maintaining independence from other layers of a network stack.

Figure 6:
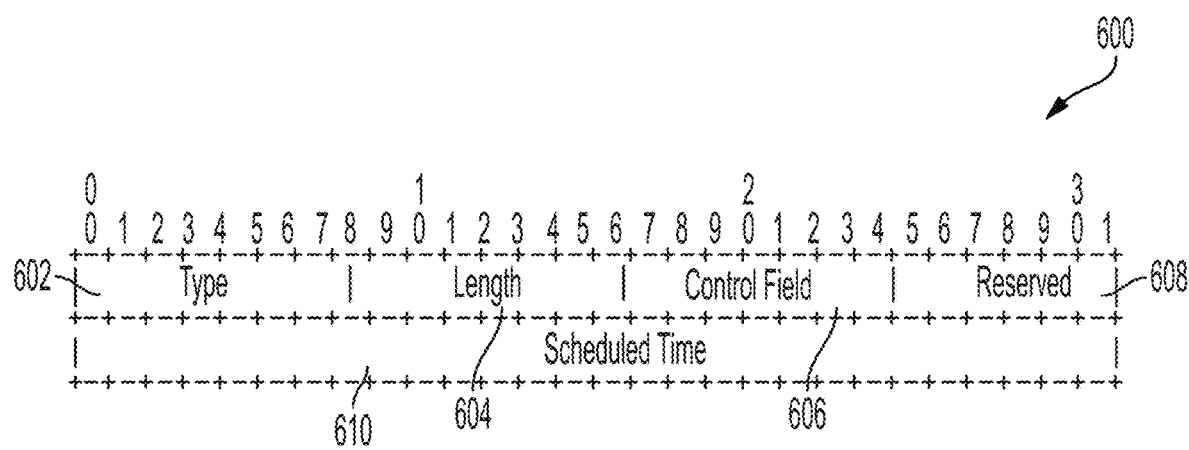
FIG. 6 is an example of a scheduled time option format of a neighbor advertisement message or a neighbor solicitation message, in accordance with one or more examples.

FIG. 6 is an example of a format for a scheduled time option 600 of a neighbor advertisement message or a neighbor solicitation message. When one or more of the nodes 106, 108, 109, and 110 are low power devices (e.g., the nodes 106, 108, 109, and 110 include a battery power source), the nodes may be in a sleep state for a significant amount of time. When the nodes 106, 108, 109, and 110 are in a sleep state, the nodes 106, 108, 109, and 110 may be unable to receive messages from other nodes or devices. Accordingly, a neighbor advertisement message and/or a neighbor solicitation message may include the scheduled time option 600, which indicates a time schedule that the node 106, 108, 109, or 110 transmitting the message will be available to receive a response.

The scheduled time option 600 may be included in a number of scenarios. For example, the scheduled time option 600 may be used generally in neighbor solicitation messages to indicate a time schedule that a node 108, 109, or 110 will be ready to receive a response. In another example, the scheduled time option 600 may be included as a single component of a neighbor advertisement message. When used as the single component of the neighbor advertisement message, the scheduled time option 600 indicates a time during which a subsequent neighbor advertisement message will be transmitted to the soliciting node 108, 109, or 110. Further, the neighbor advertisement message may include the node status option 400 along with the scheduled time option 600 to trigger an indication of a time during which the soliciting node 108, 109, or 110 can try to send a subsequent neighbor solicitation message. Moreover, when a node 108, 109, or 110 has solicited neighboring node information through a node solicitation message including the scheduled time option 600, a neighboring node may be able to create space in a cache prior to the scheduled time indicated in the node solicitation message. Thus, the neighbor advertisement message may respond with an indication of cache availability with the node status option 400 without including the scheduled time option 600.

The scheduled time option 600 may include a type indication 602 that provides an 8-bit identifier of an option type to follow. In the scheduled time option 600, the type indication 602 indicates that the option type is a scheduled time option. The scheduled time option 600 also includes a length identifier 604. The length identifier 604 may include an 8-bit unsigned integer that includes information about a data length of the scheduled time option 600 inclusive of the type indication 602 and the length identifier 604. A value of the length identifier 604 may be provided in units of octets, and a value of 0 is invalid. For example, an indication of at least two octets to indicate the presence of the type indication 602 (a first octet) and the length identifier 604 (a second octet), in addition to any octets associated with a control field 606, a reserved field 608, and a scheduled time indicator 610, may be indicated in the length identifier 604.

The control field 606 may include an 8-bit number that specifies a time format of the scheduled time indicator 610. For example, a value of 0 in the control field 606 may specify that the time format of the scheduled time indicator 610 is in Greenwich Mean Time (GMT) format. Alternatively, a value of 1 in the control field 606 may specify that the time format of the schedule time indicator 610 is in number of milliseconds from a time of transmission of a message including the scheduled time option 600.

The reserved field 608 may be included at the end of a line of data in the scheduled time option 600. As illustrated, the reserved field 608 is positioned between the control field 606 and the scheduled time 610. The reserved field 608 is variable in length, and the reserved field 608 provides padding to a line of data such that a final structure of the scheduled time option 600 is 32 bits aligned. Because the type indication 602, the length identifier 604, and the control field 606 occupy the first 24 bits of the first line of data, the reserved field 608 is used to pad the final 8 bits of the first line of data.

The scheduled time indicator 610 is positioned on a second line of data and includes a 32-bit unsigned number. The value provided by the scheduled time indicator 610 specifies a scheduled time that the device transmitting a node solicitation message will be available to receive a response. As mentioned above, the scheduled time indicator 610 may be provided in GMT format or in a number of milliseconds from a time of transmission. Other time formats presented in the scheduled time indicator 610 are also contemplated within the scope of the present disclosure. In one or more examples, a solicited neighbor advertisement message may include the scheduled time indicator 610 in a message from a potential parent node to a node that initially sent a neighbor solicitation message. In such an example, the neighbor advertisement message may include a node status option 400 indicating no current availability and the scheduled time option 600 with the scheduled time indicator 610 that represents an amount of time for the node soliciting a neighboring node link to wait while the potential parent node performs an operation to clear a portion of a neighbor cache to make room for the new neighboring node link. When the neighbor advertisement message includes the scheduled time indicator 610 without the node status option 400, the scheduled time indicator 610 may indicate a time at which a subsequent neighbor advertisement message will be sent.

When the neighbor solicitation messages and the neighbor advertisement messages include the scheduled time option 600, the low power devices 110 seeking parent node links, seeking status updates, or providing neighbor solicitation messages may conserve battery by avoiding time spent awake while no new messages are scheduled to arrive at the low power devices 110. The likelihood of receiving a message by the low power device 110 may also increase. For example, the low power devices 110 may transmit the neighbor solicitation messages with response times indicated by the scheduled time option 600. Thus, the low power devices 110 may sleep until the response time is satisfied. At that point, the low power devices 110 may awake to receive a message from another node.

Likewise, a mains power node may provide the scheduled time indicator 610 to the low power device 110 in the expectation that the mains power node will clear neighbor cache space for the low power device 110 in the interim. In such an example, the low power device 110 can reenter a sleep mode and awake to retry the neighbor solicitation message at the scheduled time. While conserving battery power of the low power device 110, the scheduled time option 600 may reduce a number of messages used to receive an adequate response at the low power device 110. Further, the scheduled time option 600 may increase the overall probability of receiving a neighbor advertisement message at the low power device 110 by providing a time window for the low power device 110 to awake and receive the message.

While the data formats 300, 400, 500, and 600 are described above as separate messages, all or any combination of the data formats 300, 400, 500, and 600 may be provided in a neighbor advertisement message, a neighbor solicitation message, or both as new or additional components of the neighbor advertisement message, the neighbor solicitation message, or both. For example, a neighbor solicitation message from the low power device 110 may include the device capabilities option 500 and the scheduled time option 600. Additionally, a neighbor advertisement message from the root node 106 may include the target address option 300, the node status option 400, the device capabilities option 500, and a scheduled time option 600. Other combinations of the formats 300, 400, 500, and 600 are also contemplated for both the node solicitation message and the node advertisement message.

Figure 7:
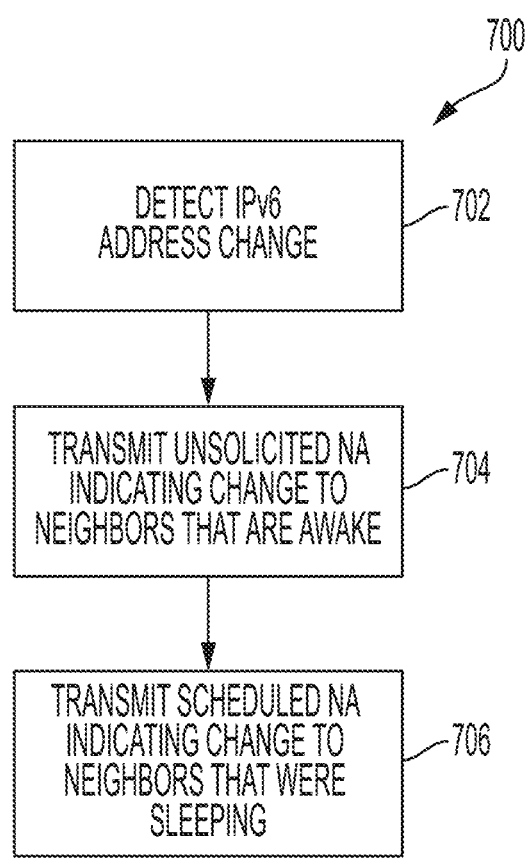
FIG. 7 is an example of a process for communicating an IP address change across linked nodes, in accordance with one or more examples.

Turning now to FIG. 7, an example of a process 700 for communicating an IPv6 address change across linked nodes is provided. In an example, linked nodes (e.g., the root node 106a and one of the child nodes 108) may communicate with each other using neighbor advertisement messages that are either solicited or unsolicited. Neighbor advertisement messages between linked nodes may be used to communicate status changes of one of the linked nodes to the other linked node, node capabilities from one of the linked nodes to the other linked node, scheduled response times from one of the linked nodes to the other linked node, an indication of an IPv6 address change from one of the linked nodes to the other linked node, or any combination thereof. By way of example, the process 700 details communication of an IPv6 address change, but similar techniques may be used for other communication between the linked nodes. At block 702, the process 700 involves detecting an IPv6 address change of the root node 106a or a parent node. When the IPv6 address changes at the root node 106a or the parent node, the root node 106a or the parent node may update the child nodes 108 and any other nodes that are linked to the root node 106a or the parent node of the change as soon as possible to avoid any loss of data transmission across the root node 106a.

At block 704, the process 700 involve transmitting an unsolicited neighbor advertisement message indicating the IPv6 address change to any neighboring nodes that are awake. Even though some of the nodes linked to the root node 106a or the parent node may be low power devices and likely not in an awake state when the root node 106a or the parent node detects the IPv6 address change, the root node 106a or the parent node may transmit the neighbor advertisement message to all neighboring nodes that are available to receive the message upon detection of the IPv6 address change. In this manner, as many neighboring nodes as possible receive an indication of the IPv6 address change as early as possible. As an example, the root node 106a or the parent node may transmit the IPv6 address change using the target address option 300, as discussed above with respect to FIG. 3.

At block 706, the process 700 involves transmitting a scheduled neighbor advertisement message indicating the IPv6 address change to neighboring nodes that were sleeping during the unsolicited neighbor advertisement message. The scheduled time may be based on receipt of a node solicitation message or node advertisement message from a low power device that included a scheduled time option 600, as discussed above with respect to FIG. 6. The scheduled neighbor advertisement message indicating the IPv6 address change is scheduled at the time indicated in the scheduled time option 600, and the neighbor advertisement message may include the target address option 300. In this manner, the process 700 is able to provide IPv6 address change updates to neighboring devices in an efficient manner while taking into account neighboring devices that are not active when the IPv6 address change is discovered.

Figure 8:
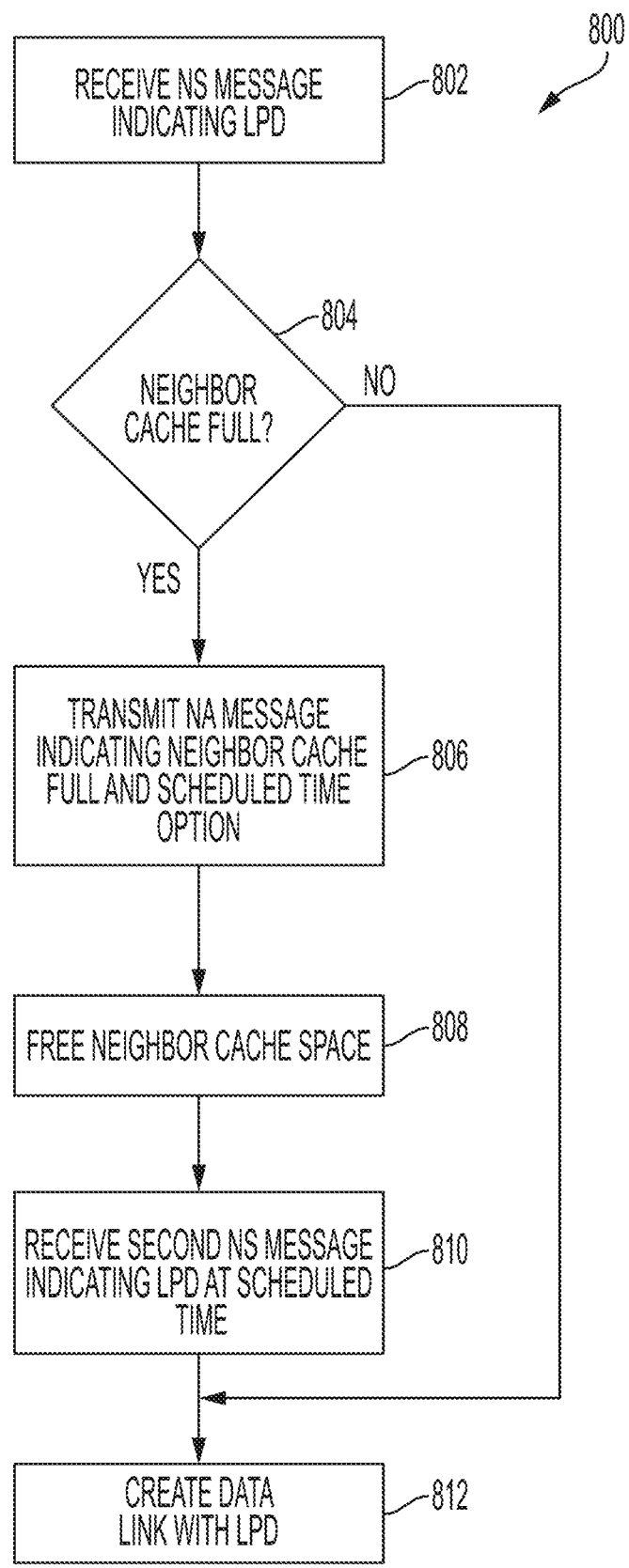
FIG. 8 is an example of a process for establishing a link between nodes when a neighbor cache of a parent node is full, in accordance with one or more examples.

FIG. 8 is an example of a process 800 for establishing a link between the root node 106 or another potential parent node and the low power device 110 when a neighbor cache of the root node 106 or the other potential parent node is full. At block 802, the process 800 involves receiving a neighbor solicitation message indicating that a low power device is soliciting to establish a bidirectional link and requesting to reserve entry of the low power device in a cache of a potential parent node. The neighbor solicitation message may include a device capabilities option 500 and a scheduled time option 600 from the low power device 110 to provide an indication that the low power device is battery powered and an indication of when the low power device 110 expects a response to the neighbor solicitation message. Other details about the low power device 110 may also be included as part of the neighbor solicitation message.

At block 804, the process 800 involves determining whether the neighbor cache of the potential parent node is full. The neighbor cache of the potential parent node may be a database that stores a link between link layer addresses and the IPv6 addresses. When the neighbor cache is full, any soliciting node (e.g., the low power device 110) wishing to link with the potential parent node is relegated to a unidirectional flow of data upon establishing a data link. That is, the flow of information may travel from the soliciting node to the potential parent node, but the potential parent node may not be available to provide data to the soliciting node.

If the neighbor cache of the potential parent node is full, at block 806, the process 800 involves transmitting a solicited neighbor advertisement message to the low power device 110 indicating that the neighbor cache is full and indicating a scheduled time for the low power device 110 to try again. This neighbor advertisement message may be transmitted to the low power device 110 at a scheduled time that was indicated by the low power device 110 during the node solicitation message. In such an example, the neighbor advertisement message may include the node status option 400 and the scheduled time option 600 to provide the low power device 110 with the neighbor cache full update and the requested response time.

In another example, at block 806, the process 800 involves transmitting the solicited neighbor advertisement message to the low power device 110 with a scheduled time indication. When the neighbor advertisement message includes a scheduled time indication without a status indicator (e.g., without an indication that the neighbor cache is full), the potential parent node is providing an indication that the potential parent node will send a subsequent neighbor advertisement message at the scheduled time (e.g., instead of receiving a subsequent neighbor solicitation message from the low power device 110). Accordingly, the low power device 110 may awake to receive the subsequent neighbor advertisement message at the scheduled time indicated in the solicited neighbor advertisement message.

At block 808, the process 800 involves freeing neighbor cache space of the potential parent node to make room for a bidirectional data link between the potential parent node and the low power device 110. Because the low power device 110 provided an indication in the node solicitation message of the low power nature of the low power device 110, the low power device 110 may have an elevated priority level in comparison to another device on mains power. For example, the low powered device 110 may rely on bidirectional data links with greater reliability than a mains power device because the mains power device is maintained in an awake state and is able to transition between potential parent nodes with greater ease. Accordingly, the potential parent node may free cache space by removing a node from a neighboring cache with a lower priority than the low powered device 110.

While the limited powered nature of the low power device 110 provides elevated priority at potential parent nodes in the example described above, other device capabilities indicated in the device capabilities option 500 may also result in elevated priority levels for a soliciting node 108 or 109 generating a neighbor solicitation message. For example, the soliciting node 108 or 109 may receive elevated priority with a potential parent node when the device capabilities indicator 506 indicates that the child node 108 or 109 relies on a shorter network joining time, relies on shorter traffic turnaround times, generates a heightened level of traffic criticality, or has any other device capabilities that merit the elevated priority. In another example, the soliciting node 108 or 109 may receive lower priority with a neighbor or potential parent node when the device capabilities indicator 506 indicates that the soliciting node 108 or 109 has a low data throughput requirement or when the soliciting node 108 or 109 is a low traffic generating device.

At block 810, the process 800 involves receiving a second neighbor solicitation message from the low powered device 110 at the scheduled time indicated in the neighbor advertise message provided to the low power device 110 by the potential parent node. The second neighbor solicitation message from the low powered device 110 may be a repeat of the initial neighbor solicitation message where the low powered device 110 provides device capabilities (e.g., an indication that the low powered device 110 is battery powered) and an indication of a scheduled time for the potential parent node to provide a response.

In the example at block 806 where the neighbor advertisement message from the potential parent node includes the scheduled time indicator without a status indicator, the potential parent node, at block 810, may send a subsequent neighbor advertisement message to the low powered device 110. The subsequent neighbor advertisement message is sent in place of receiving the second neighbor solicitation message from the low powered device 110. In such an example, the subsequent neighbor advertisement message may include a status indicator indicating that the neighbor cache of the potential parent node has space.

When the neighbor cache space is freed in the potential parent node, at block 812, the process 800 involves establishing a bidirectional data link between the potential parent node the low power device 110. Additionally, the potential parent node may respond to the neighbor solicitation message from the low power device 110 at the scheduled time with a neighbor advertisement message. The neighbor advertisement message may include the target address option 300 indicating the target MAC addresses and the IPv6 addresses of the potential parent node. Additionally, the neighbor advertisement message may provide a node status option 400 with a node status indicating that the bidirectional data link is successful.

When, at block 804, the neighbor cache of the potential parent node is determined to not be full, the process 800 may proceed directly to block 812. At block 812, the process 800 involves establishing a bidirectional data link between the potential parent node and the low power device 110. Additionally, the potential parent node may respond to the neighbor solicitation message from the low power device 110 at the scheduled time from the neighbor solicitation message received at block 802 with a neighbor advertisement message. The neighbor advertisement message may include the target address option 300 indicating the target MAC addresses and the IPv6 addresses of the potential parent node. Further, the neighbor advertisement message may provide a node status option 400 with a node status indicating that the bidirectional data link is successful.

Figure 9:
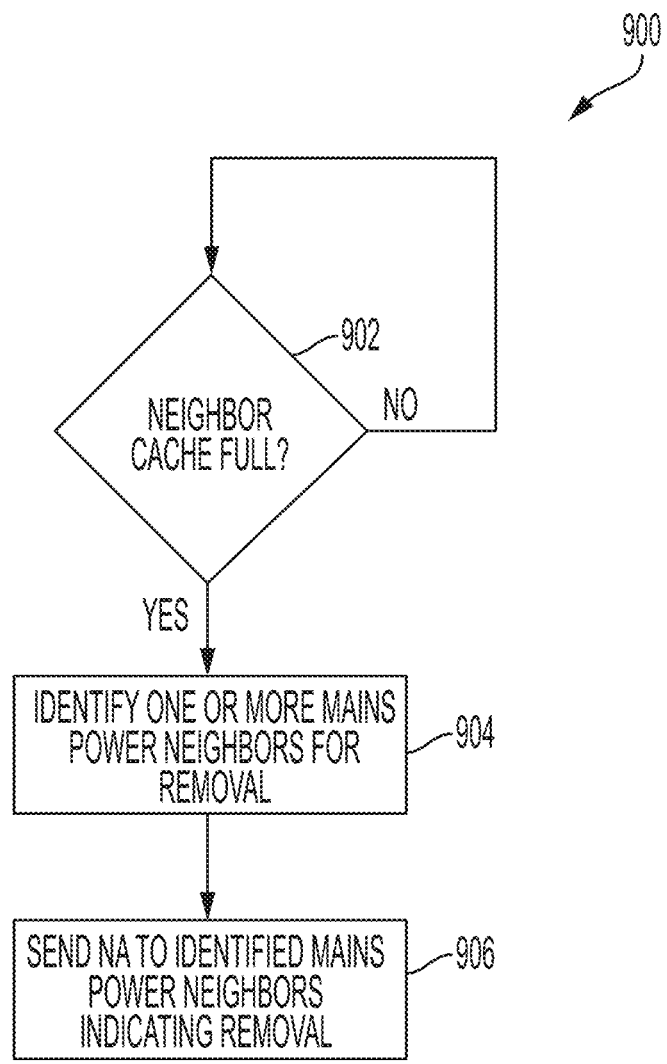
FIG. 9 is an example of a process for removing a link between nodes when a neighbor cache of a parent node is full, in accordance with one or more examples.

FIG. 9 is an example of a process for removing a link between nodes when a neighbor cache of the potential parent node is full. At block 902, the process 900 involves determining if the neighbor cache of the potential parent node is full. If the neighbor cache is not full, the process 900 may repeat the determination at block 902 until the neighbor cache reaches a full state. In an example, block 902 may be initialized when the potential parent node receives a neighbor solicitation message from a neighboring device with a high priority (e.g., a low powered device).

When the neighbor cache is full, and the potential parent node has received a neighbor solicitation message from a high priority neighboring device, at block 904, the process 900 involves identifying one or more mains power neighbors, or any other neighbor based on other criteria, of the potential parent node for removal from the neighbor cache. For example, the potential parent node may identify mains power neighbors with poor neighbor unreachability detection (NUD) success ratios as mains power neighbors that are available for removal. Additionally, the potential parent node may identify a mains power neighbor with the maximum amount of time since the potential parent node has received a neighbor discovery protocol (NDP) message from the mains power neighbor, or any other neighbor based on other criteria.

At block 906, the process 900 involves sending an unsolicited neighbor advertisement message to the identified mains power neighbors indicating the removal of the mains power neighbor from a bidirectional data link with the potential parent node. The node advertisement message may include the node status option 400 with a node status indication that the neighbor cache entry for the identified neighbors has been deleted or will be deleted. Upon receiving such a node advertisement message, the identified mains power neighbors are able to obtain new bidirectional data links with an alternative potential parent node. Further, the potential parent node that freed cache space is then able to generate a bidirectional data link with the neighboring device with the high priority.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A neighboring node discovery method, comprising:
   receiving, at a first node, a first neighbor solicitation message comprising:
      a first indication that a second node is a low power device; and
      a first scheduled response time;
   increasing a priority level of the second node above at least one mains power node upon receiving the first indication that the second node is a low power device;
   transmitting at the first scheduled response time, by the first node, a first neighbor advertisement message comprising:
      a second indication of no availability in a neighbor cache of the first node; and
      a second scheduled response time;
   removing one or more nodes from the neighbor cache;
   receiving, by the first node at the second scheduled response time, a second neighbor solicitation message from the second node; and
   linking the first node with the second node.

2. The method of claim 1, wherein removing the one or more nodes from the neighbor cache comprises:
   identifying the one or more nodes linked to the first node; and
   transmitting to the one or more nodes, by the first node, a second neighbor advertisement message with a node status indication that a neighbor cache entry for the one or more nodes has been deleted or will be deleted.

3. The method of claim 2, wherein the one or more nodes removed from the neighbor cache are mains power nodes, nodes comprising poor neighbor unreachability detection success ratios, nodes from which the first node has not received a neighbor discovery protocol message within a time threshold, or any combination thereof.

4. The method of claim 1, wherein the first neighbor advertisement message comprises a target address option comprising i) identification of a set of link layer addresses associated with the first node and ii) identification of a set of IPv6 addresses associated with each link layer address of the first node.

5. The method of claim 1, comprising:
upon linking the first node and the second node, transmitting, from the first node, an unsolicited neighbor advertisement message comprising a new node status indicating a lack of IP layer connectivity, wherein the unsolicited neighbor advertisement message is transmitted immediately upon determining the lack of IP layer connectivity, and the unsolicited neighbor advertisement message is transmitted at subsequent scheduled response times.

6. The method of claim 1, comprising:
upon linking the first node and the second node, transmitting, from the first node, an unsolicited neighbor advertisement message comprising an indication of a change to at least one IPv6 address for a link layer address associated with the first node, and an indication of at least one changed IPv6 address for the link layer address, wherein the unsolicited neighbor advertisement message is transmitted immediately upon determining the change to the at least one IPv6 address, and the unsolicited neighbor advertisement message is transmitted at subsequent scheduled response times.

7. The method of claim 6, wherein the unsolicited neighbor advertisement message is transmitted to each node linked with the first node.

8. A node of a network, comprising:
a processor configured to execute computer-readable instructions;
a memory configured to store the computer-readable instructions that, when executed by the processor, cause the processor to perform operations comprising:
receiving a first neighbor solicitation message comprising a first scheduled response time from an additional node, wherein the first neighbor solicitation message comprises an indication that the additional node comprises an elevated priority level based on the additional node receiving power from a battery;
transmitting at the first scheduled response time a first neighbor advertisement message to the additional node;
removing one or more mains power nodes from a neighbor cache when the neighbor cache is full due to the indication that the additional node comprises the elevated priority level over the one or more mains power nodes; and
establishing a link with the additional node.

9. The node of claim 8, wherein the processor is configured to perform operations comprising:
reserving space in a neighbor cache for one or more prioritized nodes based on capability of the one or more prioritized nodes, wherein the one or more prioritized nodes comprise the additional node.

10. The node of claim 8, wherein the first neighbor advertisement message comprises a second scheduled response time, and wherein the processor is further configured to perform operations comprising:
transmitting, at the second scheduled response time, a second neighbor advertisement message to the additional node indicating availability in a neighbor cache.

11. The node of claim 10, the operations further comprising removing one or more nodes from the neighbor cache prior to transmitting the second neighbor advertisement message, wherein removing the one or more nodes from the neighbor cache comprises:
identifying one or more mains power nodes linked to the node; and
transmitting to the one or more mains power nodes, by the node, a third neighbor advertisement message with a node status indication that a neighbor cache entry for the one or more nodes has been deleted or will be deleted.

12. The node of claim 8, further comprising:
resource consumption metering hardware, wherein the node is a metering node of a resource consumption metering network.

13. The node of claim 8, wherein the link with the additional node comprises a tentative link comprising entry of the additional node in a tentative cache location.

14. A node, comprising:
a processor configured to execute computer-readable instructions;
a memory configured to store the computer-readable instructions that, when executed by the processor, cause the processor to perform operations comprising:
transmitting a neighbor solicitation message comprising an indication that the node is a low power device, wherein the indication that the node is a low power device increases a priority level of the node above at least one mains power node linked with a potential parent node;
establishing a link with the potential parent node;
receiving an unsolicited neighbor advertisement message from the potential parent node indicating a status change of the potential parent node; and
updating a neighbor cache stored in the memory to address the status change of the potential parent node.

15. The node of claim 14, wherein the status change to the potential parent node comprises an indication of no IP layer connectivity at the potential parent node.

16. The node of claim 15, wherein updating the neighbor cache to reflect the status change of the potential parent node comprises establishing a new link with a different neighboring node and updating the neighbor cache with information about the different neighboring node, wherein the node selects the different neighboring node based on device capability options and node status options of the different neighboring node.

17. The node of claim 14, wherein the unsolicited neighbor advertisement message comprises a target address option format, and the status change to the potential parent node indicated in the target address option format comprises a change in at least one IPv6 address of the potential parent node.

18. The node of claim 17, wherein updating the neighbor cache to reflect the status change of the potential parent node comprises changing the at least one IPv6 address of the potential parent node in the neighbor cache.

* * * * *